United States Patent [19]

Watanabe et al.

[11] Patent Number: 4,597,931
[45] Date of Patent: Jul. 1, 1986

[54] METHOD OF MANUFACTURING A WINDSHIELD HAVING A COATING OF VARYING THICKNESS

[75] Inventors: Masaki Watanabe, Saitama; Akio Yagasaki, Tokyo; Toru Murayama, Saitama; Kazuya Yonekura, Gunma, all of Japan

[73] Assignee: Honda Giken Kogyo Kabushiki Kaisha, Tokyo, Japan

[21] Appl. No.: 476,758

[22] Filed: Mar. 18, 1983

[30] Foreign Application Priority Data

Mar. 19, 1982 [JP] Japan .................. 57-42884

[51] Int. Cl.⁴ .............. B29D 11/00; B05C 3/00; B05D 1/18; B32B 27/36
[52] U.S. Cl. .................. 264/129; 118/421; 264/320; 264/328.1; 427/9; 427/256; 427/430.1; 428/172; 428/412; 428/447
[58] Field of Search ............ 264/129; 427/430.1, 427/256, 9; 428/412, 172, 447; 118/421

[56] References Cited

U.S. PATENT DOCUMENTS

| | | | |
|---|---|---|---|
| 2,339,433 | 1/1944 | Staehle | 264/129 X |
| 2,853,400 | 9/1958 | Ahlbin | 118/421 X |
| 3,121,646 | 2/1964 | Smart | 118/421 X |
| 3,309,220 | 3/1967 | Osteen | 427/430.1 X |
| 3,566,891 | 3/1971 | Koch, II | 118/421 X |
| 3,662,053 | 5/1972 | Yoshikawa et al. | 264/129 |
| 3,953,115 | 4/1976 | French et al. | 428/412 X |
| 3,956,540 | 5/1976 | Laliberte et al. | 118/421 X |
| 4,293,603 | 10/1981 | Hayman-Chaffey et al. | 264/129 X |
| 4,299,886 | 11/1981 | Soejima et al. | 428/412 |
| 4,308,317 | 12/1981 | Olson et al. | 428/412 |
| 4,318,962 | 3/1982 | Boucher | 264/129 X |
| 4,368,222 | 1/1983 | Blegen et al. | 264/129 X |
| 4,371,585 | 2/1983 | Memon | 428/412 |
| 4,382,109 | 5/1983 | Olson et al. | 428/412 X |
| 4,384,026 | 5/1983 | Moore et al. | 428/412 |
| 4,395,461 | 7/1983 | Ching | 428/412 |
| 4,405,679 | 9/1983 | Fujioka et al. | 428/412 X |
| 4,413,025 | 11/1983 | Haga et al. | 428/412 X |
| 4,425,403 | 1/1984 | Taniguchi et al. | 428/412 X |
| 4,444,973 | 4/1984 | Schonfelder et al. | 428/412 X |
| 4,455,322 | 6/1984 | Weber | 427/430.1 X |
| 4,468,425 | 8/1984 | Gilleo et al. | 428/172 |

FOREIGN PATENT DOCUMENTS

839597 9/1979 U.S.S.R. .................. 118/421

OTHER PUBLICATIONS

Simonds, Herbert R.; Archie J. Weith and M. H. Bigelow, *Handbook of Plastics*, Second Edition, New York, D. Van Nostrand, ©1949, pp. 1416, 1429, 1433.
*SPI Plastics Engineering Handbook*, Third Edition, New York, Reinhold, ©1964, pp. XIV; XIViii.
*Dictionary of Plastics*, by J. A. Wordingham and P. Reboul, Feltham, Middlesex, England, Newnes Books, ©1968, pp. 43–46, 151, 152, 177.
*Whittington's Dictionary of Plastics*, by Lloyd R. Whittington, Stamford, Conn., Technomic, ©1968, pp. 51, 52, 198, 199, 238, 239.
DuBois, J. Harry and Frederick W. John, *Plastics*, Fifth Edition, New York, Van Nostrand Reinhold, ©1974, pp. 448, 449, 479, 491.

*Primary Examiner*—Philip Anderson
*Attorney, Agent, or Firm*—Sughrue, Mion, Zinn, Macpeak, and Seas

[57] ABSTRACT

A windshield for a two-wheeled motor vehicle, or the like, having a predetermined shape formed from a resin, at least a portion of the windshield carrying a hard coated layer thereon. The hard coated layer has a varying thickness. The windshield is manufactured by forming a hard coated layer on a windshield base molded from a resin and having a predetermined shape by dipping the base in a coating solution, and then withdrawing the base from the solution at a varying speed. Spray coating may also be used.

4 Claims, 29 Drawing Figures

METHOD OF MANUFACTURING A WINDSHIELD HAVING A COATING OF VARYING THICKNESS

BACKGROUND OF THE INVENTION

This invention relates to the surface treatment of a windshield formed from a resin for use on a small and light vehicle such as a two- or three-wheeled motor vehicle, particularly one provided with a wiper.

Figure 1:
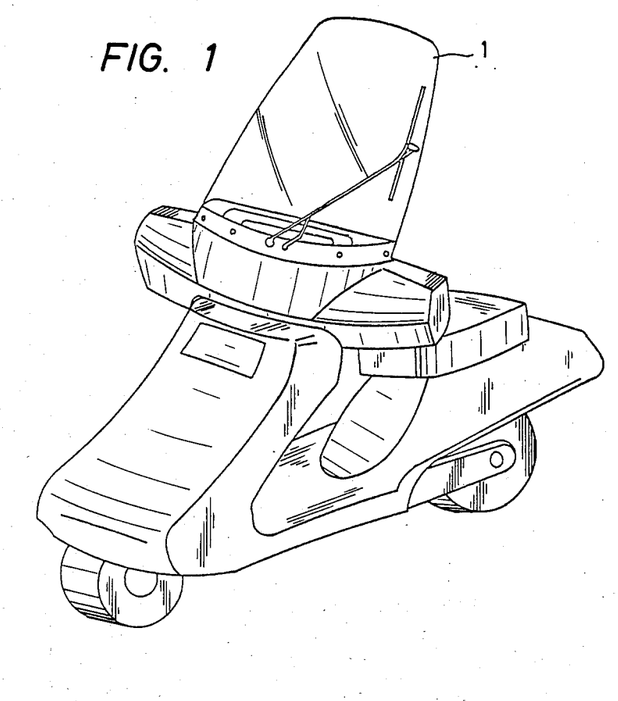
FIG. 1 is a schematic perspective view of a two-wheeled motor vehicle having a windshield.

If a windshield 1, as shown in FIG. 1 defining the fairing of a two-wheeled motor vehicle or the like is formed from a synthetic resin, it is low in surface hardness. Consequently, repeated wiper action is likely to damage the surface by scratching, abrasion or the like.

In order to avoid such damage, it is possible to fit in the center of the synthetic resin plate a glass plate insert which is sufficiently large to cover the area within which the wiper functions. This, however, leads to complications in the windshield manufacture and construction, an increase in the cost of the windshield, and a greater vehicle weight.

Coating the surfaces of a synthetic resin base with a hard resin is a generally known hardening coating treatment. This treatment makes it possible to reduce the complications of the windshield manufacture and construction, and any significant increase in the weight of the vehicle.

Figure 2:
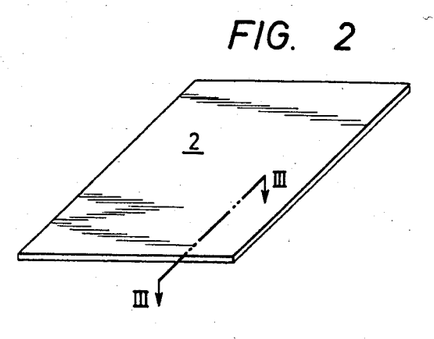
FIGS. 2 to 6 are views illustrating a prior art method of manufacturing a hard coated windshield.
Figure 3:
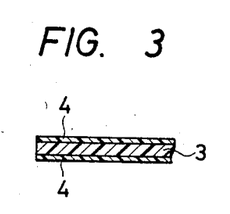
Figures 4, 5:
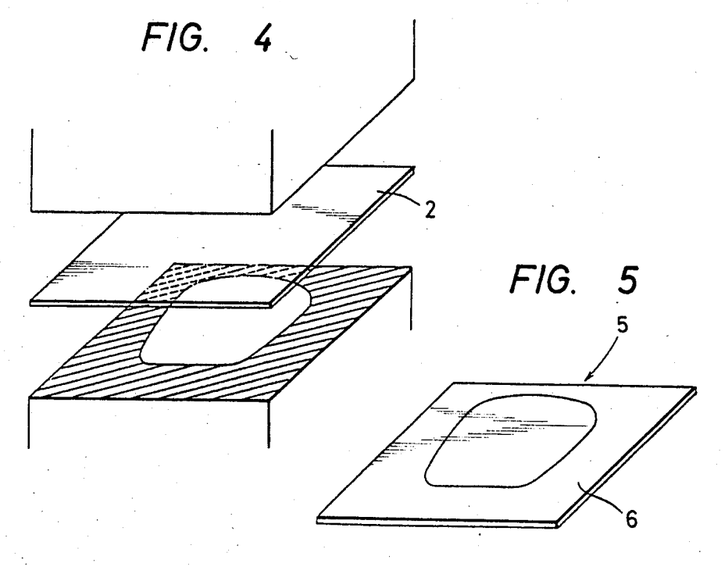

The prior art method of manufacturing a hard coated windshield comprises applying a uniform coating 4 to the surfaces of a flat resin base 3 to form a hard coated plate 2 as shown in FIGS. 2 and 3. Next as shown in FIG. 4, the plate is pressure formed and trimmed (FIG. 5) to eliminate the unnecessary portion 6 from an intermediate product 5. A finished windshield 1 as shown in FIG. 6 is obtained.

The coating 4 on the unnecessary portion 6 is, however, wasted. Also, since the hard coated resin base is naturally high in surface hardness, the press forming operation is likely to cause cracking of the coating 4, depending on the degree to which it is pressed.

Figures 6, 7:
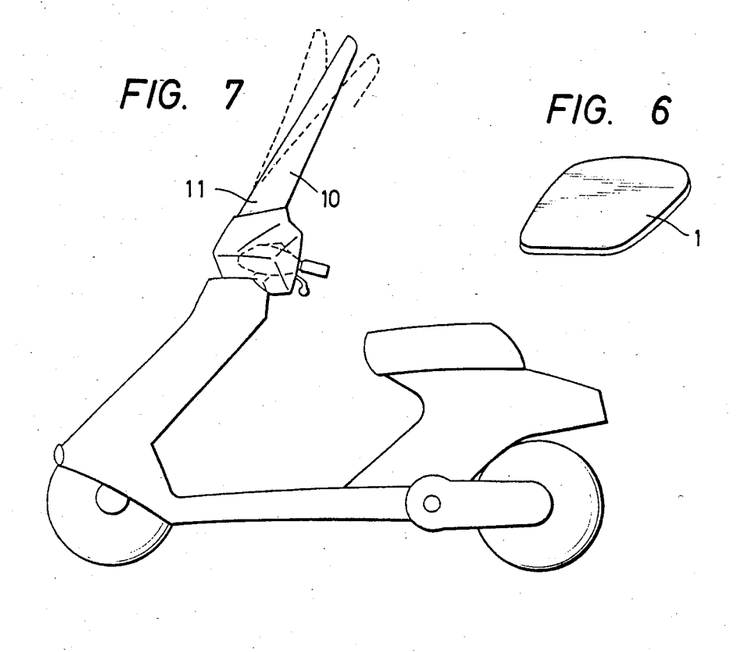
FIG. 7 is a schematic side elevational view of a two-wheeled motor vehicle showing the flexure of a windshield by vibration.

When a two-wheeled motor vehicle is running, its vibration imparts a relatively high flexural load to the mounting portion 11 of a windshield 10 as shown in FIG. 7. Accordingly, it is preferable to form a thin coating on the mounting portion 11 so that it may not crack, while a thick coating is provided on that portion of the windshield against which the wiper rubs.

The method of manufacturing a windshield by press forming a hard coated plate, however, makes it relatively difficult to apply a locally varying coating thickness, or apply a coating to only a selected area.

SUMMARY OF INVENTION

Given these shortcomings of the prior art, the inventors have succeeded in improving the prior art techniques by effectuating a hard coating treatment on a resin base after it has been formed into a selected windshield shape.

It is therefore an object of this invention to provide a resin-based windshield which is light in weight, inexpensive to manufacture, and highly durable for use with a wiper or the like.

It is another object of this invention to provide a method for the manufacture of a hard coated windshield which enables the application of a hard coating only in a selected portion of the windshield, or a greater coating thickness in a selected portion than in any other portion of the windshield, as the case may be, without causing the coated layer to crack or become otherwise defective.

In accordance with the present invention, a hard coated layer on a windshield base molded from a resin and having a predetermined shape is achieved by dipping the base in a coating solution and subsequently withdrawing it at a varying predetermined speed. The resulting hard coated layer has a varying thickness. Spray coating a limited area can also be employed.

A description follows of the method of manufacturing a windshield according to this invention and the resulting product by referring to the drawing wherein;

DESCRIPTION OF THE PREFERRED EMBODIMENTS

A method of coating an object by dipping it in a coating solution, and withdrawing it therefrom is known as dip coating.

The object coated by the dip coating method, however, has a different coating thickness between its upper and lower portions, since the coating solution flows down when the object is withdrawn from the coating bath.

Figure 8:
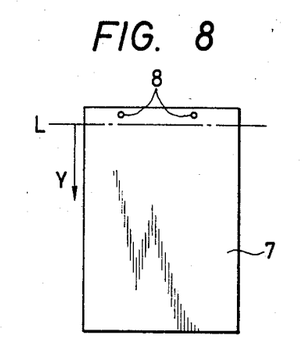
FIG. 8 is a view showing a flat plate to be dip coated.
Figure 9:
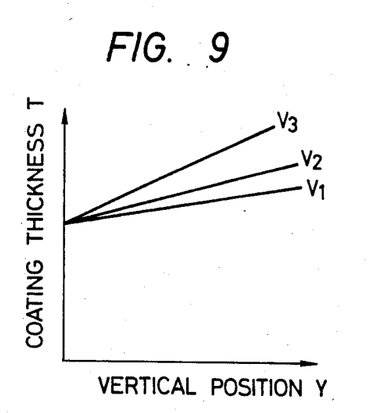
FIG. 9 is a graph showing the relation between the coating thickness T obtained by the dip coating of the plate and the dipping depth Y.

This phenomenon was ascertained by a method which will now be described. A flat plate 7 as shown in FIG. 8 was suspended from means engaged with its apertures 8, and dipped in a coating solution. It was withdrawn from the coating bath at a constant speed, and after the coating solution had been dried and solidified, the thickness of the coated film was measured. It was found that the film thickness T was substantially proportional to the dipping depth Y below the surface level L of the coating solution. This relationship is shown in FIG. 9 wherein a lower portion of the plate had a greater film thickness than a higher portion.

It was also confirmed that the film thickness T differed with the speed at which the plate had been withdrawn from the coating bath, and that an increase in the speed V ($V_1 < V_2 < V_3$) had resulted in a greater film thickness.

The inventors utilize these phenomena of dip coating in the hard coating treatment of a windshield formed from a resin.

Figure 10:
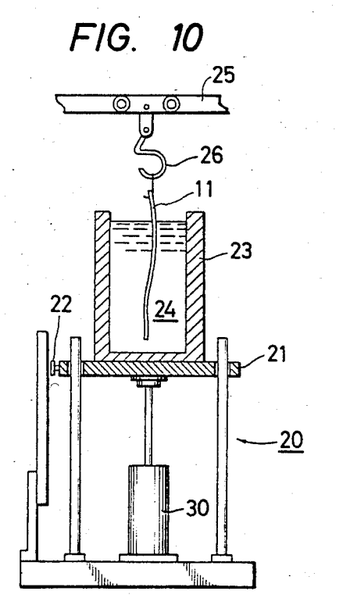
FIGS. 10 and 11 illustrate a hard coating apparatus for a windshield embodying this invention.
Figure 11:
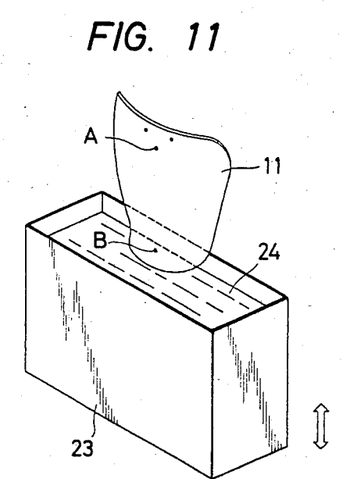

The hard coating operation will first be described with reference to FIGS. 10 and 11.

A jack 20 has a table 21 which is vertically movable by a hydraulic cylinder 30. A vertical position detector 22 is attached to the table 21. A dipping tank 23 rests on the table 21, and contains a silicone coating solution 24. A windshield base 11 formed from a resin, such as a polycarbonate, is suspended from a hanger 26 attached to a chain conveyor 25, and dipped in the coating solution 24. The windshield has a mounting portion A and a viewing portion B.

Figure 12:
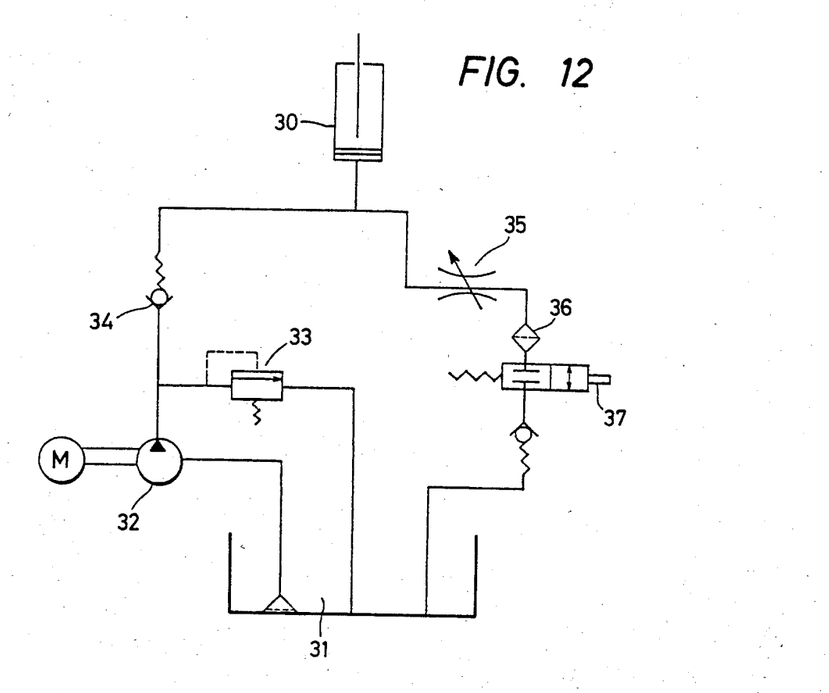
FIG. 12 is a diagram illustrating a hydraulic operating system for the coating apparatus.

A hydraulic control system for the hydraulic cylinder 30 is shown in FIG. 12. Hydraulic fluid is drawn from a fluid tank 31 by a hydraulic pump 32 and supplied to the hydraulic cylinder 30 through a check valve 34 at a pressure set on a relief valve 33, whereby the dipping tank 23 is raised. In order to lower the dipping tank 23, a solenoid valve 37 is actuated to return the hydraulic fluid from the hydraulic cylinder 30 to the fluid tank 31 through a throttle valve 35, a filter 36 and the solenoid valve 37.

Figure 13:
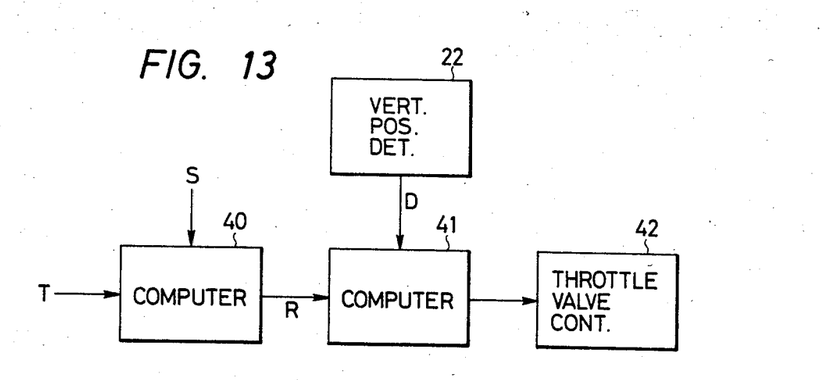
FIG. 13 is a block diagram showing a control system for the coating apparatus.

The throttle valve 35 is controlled by a control circuit shown by a block diagram in FIG. 13 in accordance with a position signal transmitted by a vertical position detector 22.

The windshield base 11 to be coated, which has a selected windshield shape formed by injection or pressure forming, is conveyed to a point above the dipping tank 23 in its lowermost position by the chain conveyor 25 and the hanger 26. The hydraulic cylinder 30 is actuated to raise the table 21, whereby the base 11 is dipped in the coating solution 24.

A computer 40 is furnished with information on a desired coating thickness T, which may, for example, be small in the mounting portion A of the windshield (FIG. 11), having a large and uniform portion with which the wiper blades will be brought into contact. If a start signal S is fed to the computer when the dipping tank 23 has been raised to its uppermost position, the computer transmits a set position signal R. A computer 41 receives the signal R and a signal D transmitted by the vertical position detector 22 indicating the vertical position of the dipping tank, and transmits at an appropriate time an output signal to a throttle valve control unit 42 to actuate throttle valve 35.

Figure 14:
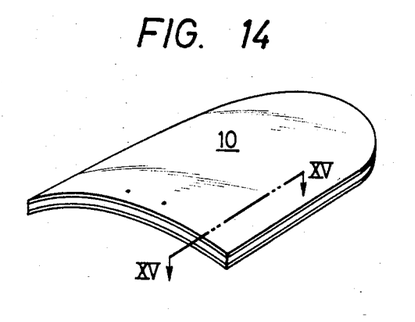
FIG. 14 is a perspective view of a windshield embodying this invention.
Figure 15:
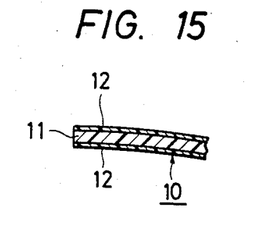
FIG. 15 is an enlarged sectional view taken along the line XV—XV of FIG. 14.

As a result, the dipping tank 23 is lowered at a predetermined speed selected to provide a selected coating thickness in accordance with the dipping depth Y of the windshield base 11. Thus, a coated layer 12 having a selected thickness is formed on the surfaces of the windshield base 11 to produce a windshield 10 shown in FIGS. 14 and 15.

If the dipping tank 23 is lowered at a constant speed, the coated layer 12 on base 11 attains a thickness on both sides which gradually increases from the mounting or bottom portion of the windshield to its head portion, as is apparent from FIG. 9. This method is also effective to coat only that area of the windshield which contacts the wiper blades, by dipping only the viewing portion of the windshield base 11 in the coating solution 24.

If, as hereinabove described, the mounting portion of the windshield 10 has a thin coating thickness, or has no coating at all, while a relatively thick coating thickness is provided in the area contacting the wiper blades, it is possible to avoid cracking of the coated layer 12 in the mounting portion to which a relatively high flexural load is applied. At the same time, the durability of the head (viewing) portion against which the wiper blades are rubbed is materially improved.

A windshield base 11 formed from a polycarbonate has a Mohs hardness of, for example, 1 to 2, a silicone coating provides a Mohs hardness of 4 thereto. By comparison, a glass plate has a Mohs hardness of about 6. This hardness renders the windshield fully capable of withstanding the friction of the wiper.

Figure 16:
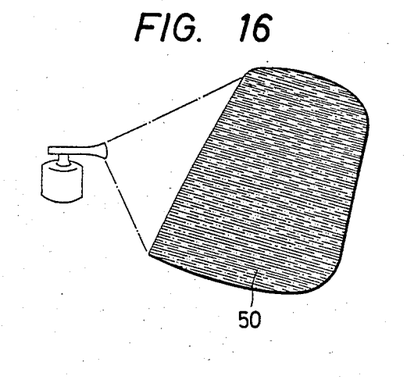
FIGS. 16 and 17 are views illustrating different modes of the hard coating treatment embodying this invention.
Figure 17:
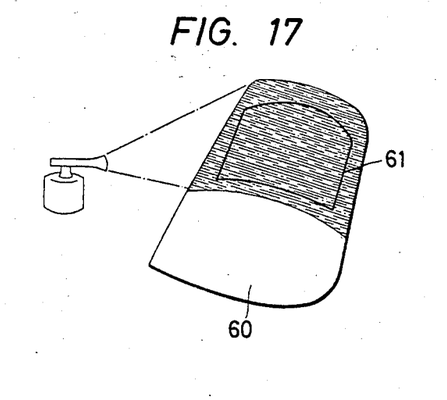

The hard coating treatment of the windshield according to this invention is not limited to dip coating, but can also be accomplished by spray coating. Spray coating is more effective than dip coating for coating only a minimum of limited area. FIG. 16 shows a windshield 50 carrying a spray-coated layer only on its surface on which the wiper is provided. FIG. 17 shows a windshield 60 carrying a spray-coated layer only on its portion with which the wiper is brought into contact. The contact area is delineated by portion 61.

Figure 18:
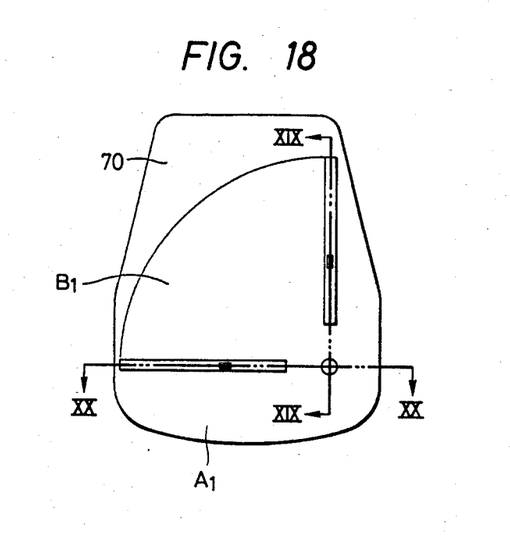
FIGS. 18 to 20, FIGS. 21 to 23, FIGS. 24 and 25, FIGS. 26 and 27, and FIGS. 28 and 29 are views illustrating windshields according to other embodiments of this invention.
Figure 19:
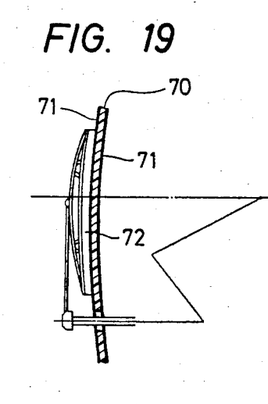
Figure 20:
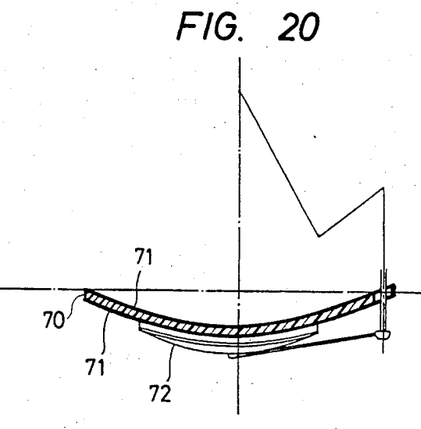

A description will now be made of several specific examples of shapes of the hard coated windshield according to this invention. Referring to FIGS. 18 to 20, a windshield 70 has a spherical sector front surface, and carries a hard coated layer 71 having a thickness which is thin in its mounting portion $A_1$ and thick in an area $B_1$, the viewing portion. The spherical sector surface of the windshield 70 fits wiper blades 72 in their resting position. A wiper shaft is centered on the true center of a sphere defined by the spherical sector windshield surface, that is, at the center of a great circle of the defined sphere. These arrangements ensure that the wiper blades rub the windshield surface only gently. The pressure of contact between the windshield 70 and the wiper blades 72 is lower than in prior art windshields, and always equal. This cooperates with the hard coating treatment in protecting the surface of the windshield 70 effectively against any damage. The surface contour of the windshield is, however, not limited to spherical, but can be of any other curved shape that may suit the wiper blade arcuate configuration. That is, the wiper blade generally exhibits flexibility to conform to a variety of curved surfaces. Given the flexure of the blade, contour to the windshield surface is achieved; however, some pressure gradient occurs.

Figure 21:
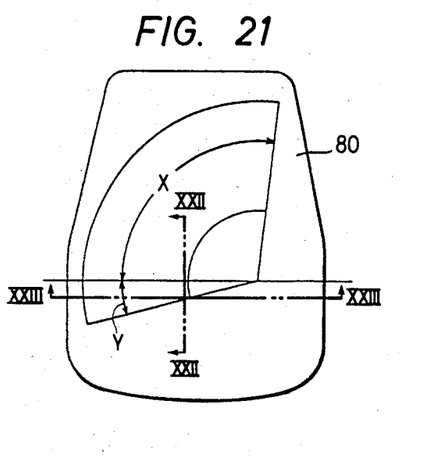
Figure 22:
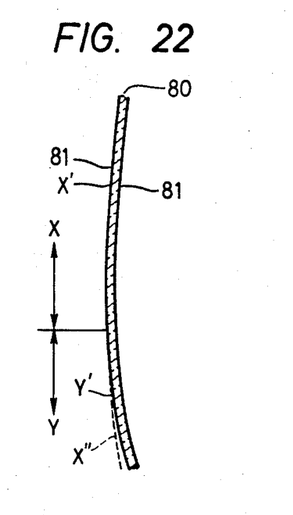
Figure 23:
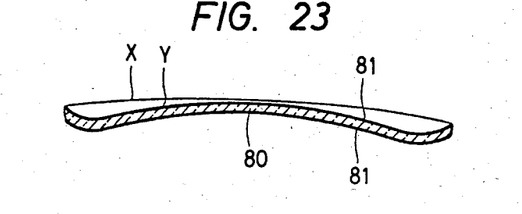

Referring to FIGS. 21 to 23, there is shown a windshield 80 having an upper portion defining a normal working area X for a wiper blade, and a lower portion defining an area Y where the wiper blade rests when it is not in use. The area X is nearly planar with a greater radius of curvature both in vertical section and in horizontal section than the area Y which is contiguously defined below the area X. The area X includes a surface X' wiped by the wiper blade, and the area Y includes a surface Y' which is inwardly recessed from a downward extension X" of the surface Y'. The surface Y' is close in contour to the wiper blade in its resting position. The windshield 80 carries a hard coated layer 81 thereon. The wiper blade in its resting position exerts only a small pressure on the windshield surface. This cooperates with the hard coating treatment in effectively preventing the wiper blade from sticking to the windshield 80, and protecting the windshield 80 against any damage.

Figure 24:
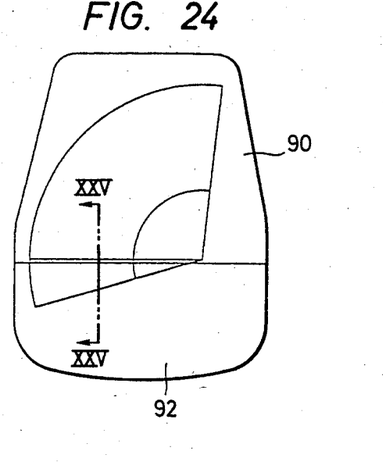
Figure 25:
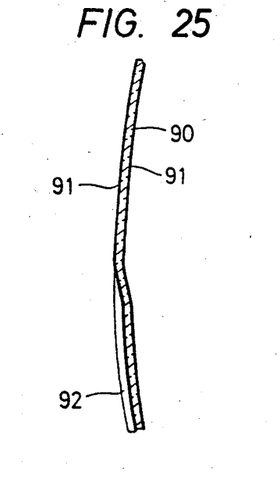

FIGS. 24 and 25 show another embodiment of the windshield 90 carrying a hard coated layer 91 in an area where a wiper functions. The windshield 90 has a lower mounting portion which is specially curved and recessed, and which has an outer surface provided with a guard plate 92 formed from a material which is not compatible with a wiper blade. The wiper blade in its resting position rests on the guard plate 92, whereby the damage of the windshield by the wiper blade due to the vibration of the vehicle, and the adherence of the wiper blade to the windshield can be effectively prevented.

Figure 26:
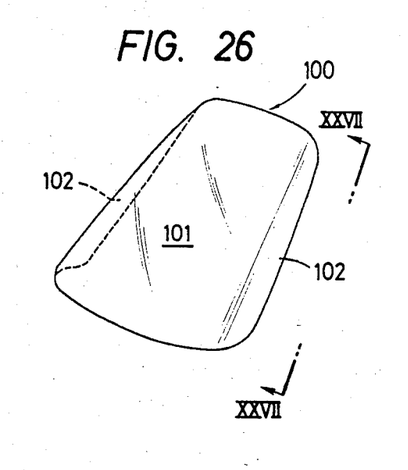
Figure 27:
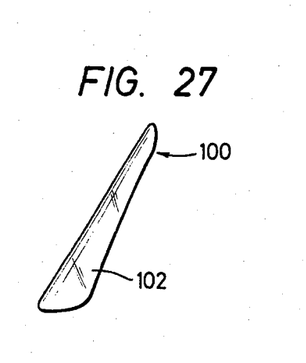

Referring to FIGS. 26 and 27, there is shown another embodiment of a windshield 100 having a hard coated surface. In this embodiment, the windshield has a substantially flat central portion 101, and a pair of side portions 102 extending rearwardly from the central portion 101. The windshield 100 has improved rigidity, is small in thickness and light in weight and has an improved resistance to the force of wind. The windshield 100 is very advantageously shaped and its rigidity is further improved by the hard coating treatment.

Figure 28:
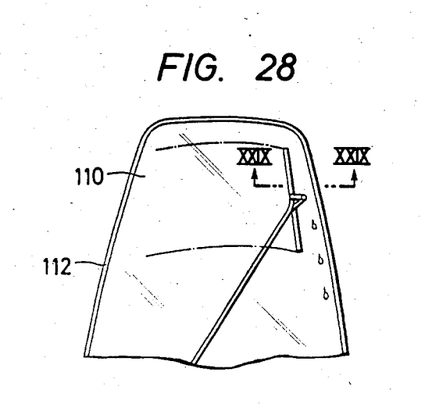
Figure 29:
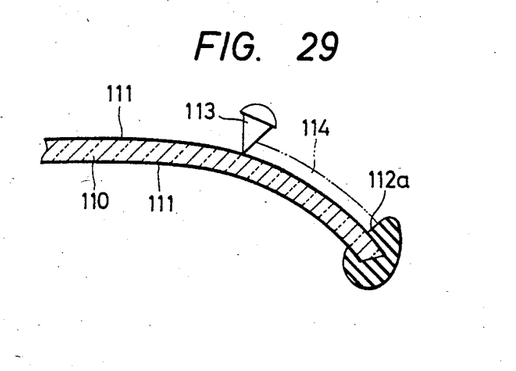

FIGS. 28 and 29 show yet another embodiment of this invention with a windshield 110 carrying a hard coated layer 111 thereon and having a peripheral edge provided with a braid 112 which may, for example, be formed from rubber. The braid 112 has an inner sidewall 112a which lies substantially perpendicular to the surfaces 111 of the windshield 110.

By virtue of its shape hereinabove described, the braid 112 prevents transverse scattering of water 114 gathered by a wiper blade 113. The water 114 flows down along the inner sidewall 112a of the braid 112, and does not scatter on the driver.

As is apparent from the foregoing description, the method for hard coating treatment according to this invention eliminates any waste of the coating material, and contributes to lowering the cost of manufacture of windshields, since a hard coating is effected on a resin plate having a selected windshield shape.

Because the resin plate is molded into a windshield shape before it is coated, it is possible to select with a considerably large degree of freedom the shape into which the plate is drawn to obtain rigidity, or the radius of curvature around the edge of the plate. The result is a sound coated layer which is free from any crack or other defect which can subsequently be formed on a windshield during actual use.

The hard coating treatment improves the rigidity of the windshield and therefore it is possible to form a windshield with a reduced thickness and a small weight at a lower cost of manufacture.

This invention has high practical utility, since it is possible to form a windshield with hard coated layer having a thickness which is greater in the portion liable to damage by the wiper or the like than in any other portion, or to effect hard coating only in such portion liable to damage. This invention is applicable to other vehicles, such as power boats, 4-wheel vehicles and the like, all of which use wiper blade elements over a portion of the windshield.

While the invention has been described with reference to the preferred embodiments, it is apparent that modifications may be practiced without departing from the essential scope thereof.

What is claimed is:

1. A method of manufacturing a windshield comprising the steps of; molding a windshield base having a predetermined shape from a resin material, suspending said base above said liquid coating bath and raising said bath to said base to immerse said base in said coating liquid, and withdrawing said base from said liquid coating bath at a predetermined variable rate of speed to provide a coating on said base of varying thickness, by sensing the vertical position of said bath once said base has been immersed to a predetermined depth, and lowering said bath away from said base at a predetermined selected speed to provide said coating of varying thickness.

2. The method of claim 1, wherein said resin material from which said windshield base is molded comprises polycarbonate and said coating on said base is a silicone coating of varying thickness.

3. The method of claim 1, wherein said step of molding comprises injection molding said base.

4. The method of claim 1, wherein said step of molding comprises pressure forming said base.

* * * * *